R. W. Stough,
Cotton Gin.

No. 88,924. Patented Apr. 13, 1869.

Witnesses
A. Benneckendorf
Wm. O. H. Morgan.

Inventor
R. W. Stough
per Munn & Co.
Attorneys

ROBERT W. STOUGH, OF GRIFFIN, GEORGIA.

Letters Patent No. 88,924, dated April 13, 1869.

IMPROVEMENT IN COTTON-GINS.

The Schedule referred to in these Letters Patent and making part of the same.

*To all whom it may concern:*

Be it known that I, ROBERT W. STOUGH, of Griffin, in the county of Spaulding, and State of Georgia, have invented a new and useful Improvement in Cotton-Gins; and I do hereby declare that the following is a full, clear, and exact description thereof, which will enable others skilled in the art to make and use the same, reference being had to the accompanying drawings, forming part of this specification.

This invention relates to an improved arrangement of means for communicating a lateral movement to the cotton as it is fed up to the saws, in order to produce a more uniform action of the saws thereon.

Figure 1:
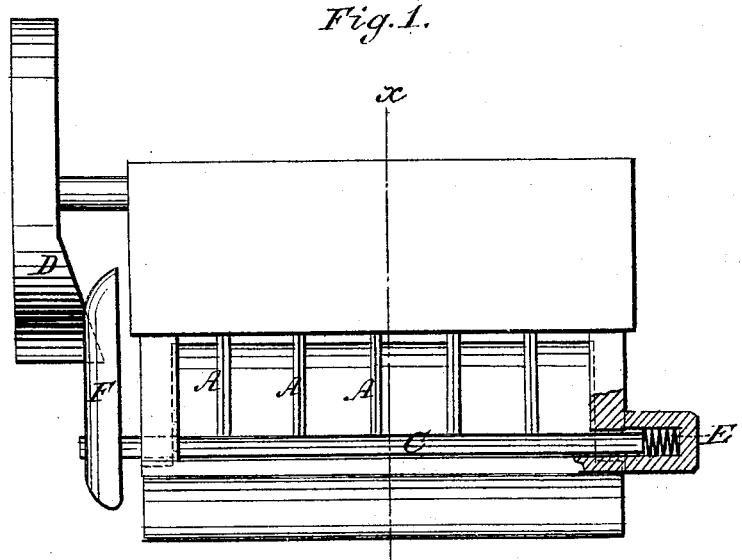
Figure 2:
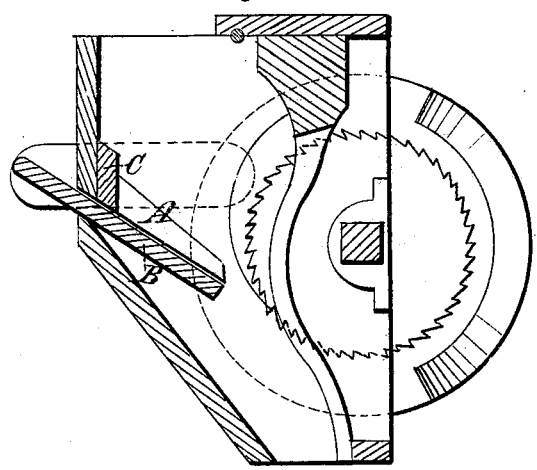

Figure 1 represents an elevation of a part of a cotton-gin, with my improvement applied thereto, and Figure 2 represents a transverse section of the same, taken on the line $x\ x$ of fig. 1.

Similar letters of reference indicate corresponding parts.

I provide a series of rigid arms, A, in front of the seed-board B, and connected to the slide-bar C, which receives a to-and-fro motion from the cam D, on the saw arbor, and a coiled spring, E, bearing against the end of the slide-bar opposite to the end actuated by the cam, the end adjacent to the cam being provided with a lug, F, against which the cam acts.

By this arrangement, the arms A receive a to-and-fro motion at right angles to that of the cotton moving up to the saws, and the downward projecting ends of the arms taking into the mass of cotton, communicates a corresponding movement to it, whereby the cotton is more uniformly presented to the saws, by which better results are produced, as will be readily understood.

Having thus described my invention,

I claim as new, and desire to secure by Letters Patent—

The bar C, carrying the rigid arms A, and operated by the arm F, cam D, and spring E, in combination with the inclined seed-board B and the saws, as herein described, for the purpose specified.

R. W. STOUGH.

Witnesses:
R. L. HOBBS,
JNO. L. DAYAL.